(12) United States Patent
Kemeny et al.

(10) Patent No.: US 11,801,963 B2
(45) Date of Patent: Oct. 31, 2023

(54) CONTAINER COMPRISING A MICROCELLULAR STRUCTURE

(71) Applicant: KULZER GMBH, Hanau (DE)

(72) Inventors: Andrea Kemeny, Usingen (DE); Mike Kondziela, Weilburg (DE)

(73) Assignee: KULZER GMBH, Hanau (DE)

( * ) Notice: Subject to any disclaimer, the term of this patent is extended or adjusted under 35 U.S.C. 154(b) by 123 days.

(21) Appl. No.: 17/294,940

(22) PCT Filed: Dec. 11, 2019

(86) PCT No.: PCT/EP2019/084607
§ 371 (c)(1),
(2) Date: May 18, 2021

(87) PCT Pub. No.: WO2020/120554
PCT Pub. Date: Jun. 18, 2020

(65) Prior Publication Data
US 2022/0017255 A1    Jan. 20, 2022

(30) Foreign Application Priority Data
Dec. 12, 2018 (DE) ..................... 10 2018 132 005.1

(51) Int. Cl.
*B65D 1/02* (2006.01)
*B29C 49/00* (2006.01)
(Continued)

(52) U.S. Cl.
CPC ........ *B65D 1/0215* (2013.01); *B29C 49/0005* (2013.01); *B29C 49/04* (2013.01);
(Continued)

(58) Field of Classification Search
None
See application file for complete search history.

(56) References Cited

U.S. PATENT DOCUMENTS

| 5,830,548 A | 11/1998 | Andersen et al. |
| 10,906,725 B2 | 2/2021 | Leser et al. |

(Continued)

FOREIGN PATENT DOCUMENTS

| AU | 677231 B2 | 4/1997 |
| AU | 2000072146 A | 2/2001 |

(Continued)

OTHER PUBLICATIONS

Kear, K.E., Developments in Thermoplastic Elastomers, vol. 14, No. 10, 2003, p. 6 (Year: 2003).*

(Continued)

*Primary Examiner* — Lee E Sanderson
(74) *Attorney, Agent, or Firm* — Norris Mclaughlin, P.A.

(57) ABSTRACT

The invention relates to a container (30), in particular a bottle (30), for storing and optionally applying a liquid, solvent-containing compositions, having a multi-layer wall (20) comprising at least one side wall of the bottle, the bottom of the bottle and optionally a discharge region at the opening of the bottle,
the multi-layer wall (20)
comprising at least an inner layer (21), a barrier layer (22) and an outer layer (23), the barrier layer (22) being adapted to form a barrier for oxygen and/or water vapour, the inner layer (21) and/or the outer layer (23) having a microcellular structure (24), the microcellular structure (24) having fluid bubbles (25), and the fluid bubbles (25) being product of a physically and/or chemically introduced blowing agent. Moreover, the invention relates to a method for producing a container, in particular a bottle (30) for storing and optionally applying a liquid, solvent-containing composition, having a multi-layer wall (20), as well as use of a multi-layer wall (20) for producing the container (30).

12 Claims, 2 Drawing Sheets

(51) Int. Cl.
  *B29C 49/04* (2006.01)
  *B29C 49/22* (2006.01)
  *B65D 30/08* (2006.01)
  *B65D 35/08* (2006.01)
  *B29K 23/00* (2006.01)
  *B29K 105/04* (2006.01)
  *B29L 31/00* (2006.01)

(52) U.S. Cl.
  CPC .............. *B29C 49/22* (2013.01); *B65D 31/02* (2013.01); *B65D 35/08* (2013.01); *B29C 2949/3046* (2022.05); *B29K 2023/086* (2013.01); *B29K 2105/041* (2013.01); *B29K 2995/0067* (2013.01); *B29L 2031/7158* (2013.01)

(56) References Cited

U.S. PATENT DOCUMENTS

| | | | |
|---|---|---|---|
| 2001/0036522 A1* | 11/2001 | Hanada | B29C 44/0461 428/36.5 |
| 2002/0182347 A1 | 12/2002 | Debrall et al. | |
| 2004/0213983 A1 | 10/2004 | Nodono et al. | |
| 2007/0254971 A1* | 11/2007 | De Vogel | B29C 70/66 521/59 |
| 2009/0026228 A1 | 1/2009 | Bressler et al. | |
| 2009/0247654 A1* | 10/2009 | Rajendran | C08J 9/0066 521/60 |
| 2011/0180509 A1* | 7/2011 | Hutchinson | B32B 27/065 215/12.1 |
| 2014/0080933 A1* | 3/2014 | Abe | C08J 9/102 521/79 |
| 2014/0376835 A1 | 12/2014 | Perick et al. | |

FOREIGN PATENT DOCUMENTS

| | | | |
|---|---|---|---|
| DE | 19511611 A1 * | 10/1996 | ............... B32B 5/18 |
| DE | 102006005608 A | 8/2007 | |
| DE | 112021002042 T5 | 4/2014 | |
| EP | 1403027 A2 | 3/2004 | |
| EP | 1742785 A2 | 1/2007 | |
| EP | 2813441 A1 | 12/2014 | |
| JP | H0612039 U | 2/1994 | |
| JP | 0612039 * | 6/1994 | |
| JP | 2004123149 A | 4/2004 | |
| JP | 2016117166 A | 6/2016 | |
| WO | 2016/141283 A1 | 9/2016 | |

OTHER PUBLICATIONS

Third page of Office Action dated Sep. 12, 2019, in connection with German Application No. 10 2018 132 005.1.
English translation and Wikipedia_Extrusionsblasformen [online], In: http://de.wikipedia.org/wiki/Extrusionsblasformen, Dec. 24, 2017.
Written Opinion in connection with PCT Application No. PCT/EP2019/084607.
English Translation of International Search Report dated Feb. 26, 2020, in connection with PCT Application No. PCT/EP2019/084607.
International Search Report dated Feb. 26, 2020, in connection with PCT Application No. PCT/EP2019/084607.

* cited by examiner

CONTAINER COMPRISING A MICROCELLULAR STRUCTURE

This application is a 371 of International Patent Application No. PCT/EP2019/084607, filed Dec. 11, 2019, which claims foreign priority benefit under 35 U.S.C. § 119 of the German Patent Application No. 10 2018 132 005.1, filed Dec. 12, 2018, the disclosures of which are incorporated herein by reference.

The invention relates to a container, in particular a bottle or tube, for storing and optionally for applying a liquid, solvent-containing composition. Moreover, the invention relates to a method for producing a bottle for storing and optionally applying a liquid, solvent-containing compositions, having a multi-layer wall, as well as use of a multi-layer wall for producing the bottle.

In dental applications, so-called bonding agents are inserted as coupling agents between tooth cavity and restorative material. Typical packagings for bonding agents are 5 ml plastic bottles for multiple applications. Formulations for bonding products may contain a larger amount of acetone. The disadvantage of acetone-containing formulations is the so-called behaviour of overboiling. When holding/pressing the bottle, heat is introduced into the plastic bottle by the users hand. This heat is also transferred to the acetone-containing formulation. Acetone possesses a very low vapour pressure, which causes the formulation to boil when heat is applied.

Currently, poor thermal conductivity of plastic is used to reduce the transfer of body heat into the bonding agent. The thicker the wall of the plastic bottle, the lower the thermal conductivity of the plastic bottle. A bottle with a large wall thickness has a higher stiffness. This means that the user has to press the bottle harder when squeezing out the liquid. Thus, exact dosing is made more difficult and represents a competitive disadvantage.

It was the object of the invention to provide a container, in particular a bottle, for storing and optionally applying a liquid, solvent-containing composition having an improved thermal insulation effect. In particular, overboiling of an acetone-containing solution in a bonding bottle during handling shall be prevented.

The object is solved by a container, in particular a bottle or tube, having a multi-layer wall with thermally insulating effect at least in part to completely. Preferably, the container, preferably the bottle or tube, shall have an elastic multi-layer wall with thermally insulating effect.

Moreover, the object of the invention is solved by a container, in particular a bottle, for storing and optionally applying a composition, preferably a liquid composition, preferably a solvent-containing composition.

The container according to the invention has a multi-layer wall at least in part to preferably completely, the multi-layer wall comprising at least an inner layer, a barrier layer and an outer layer, the barrier layer being adapted to form a barrier for oxygen and/or water vapour, the inner layer and/or the outer layer having a microcellular structure, the microcellular structure having fluid bubbles, and the fluid bubbles being product of a physically and/or chemically introduced blowing agent.

The container having at least a side wall and an opening as well as optionally a bottom, the side wall being formed from a multi-layer wall, and the multi-layer wall comprising at least an inner layer, a barrier layer and an outer layer, the barrier layer being adapted to form a barrier for oxygen and/or water vapour, the inner layer and/or the outer layer having a microcellular structure, the microcellular structure having fluid bubbles, and the fluid bubbles being product of a physically and/or chemically inserted blowing agent.

A container according to the invention may be selected from a bottle, a tube, a single-dose vial, a multi-dose vial, a bag, sachet and/or a syringe body. A tube is understood to be an elongated, formable container which usually may receive pasty or viscous compositions. The volume of the container preferably amounts from 0.3 ml to 250 ml. Particularly preferably, the container, in particular the dental bottle, is reversibly closable in an air and solvent tight manner by a closure. A container according to the invention, in particular steady container, is feasible for receiving and storing of organic solvent-containing compositions, such as a dental liquid or a dental gel, a dental adhesive, dental bonding agent, dentin coupling agent, dental primer or dental etching agent.

The bottle having at least a side wall, a bottom and optionally a discharge region at the opening of the bottle, the side wall of the bottle, the bottom and the discharge region of the bottle having a multi-layer wall, and the multi-layer wall comprising at least an inner layer, a barrier layer and an outer layer, the barrier layer being adapted to form a barrier for oxygen and/or water vapour, the inner layer and/or the outer layer having a microcellular structure, the microcellular structure having fluid bubbles, and the fluid bubbles being product of a physically and/or chemically introduced blowing agent.

Likewise, a subject matter of the invention is a bottle which comprises at least one side wall, a bottom of the bottle and a discharge region at the opening of the bottle or at least one side wall comprising the lower region of the bottle and a discharge region at the opening of the bottle, the bottle being formed of the at least one multi-layer wall. According to an alternative, the container, in particular the bottle, tube, single-dose vial, bag, sachet and/or syringe body, consists of a multi-layer wall.

In this way, a container, in particular a bottle or tube, having a foamed multi-layer wall is provided in an advantageous manner, having a substantial weight reduction, a better thermal insulation effect in relation to compact blow mouldings. In particular, the foamed plastic bottle has a lower thermal conductivity. The foamed multi-layer wall may be embodied such that the heat introduction from the user into the bonding agent is reduced, so that no overboiling of e.g. acetone-containing compositions occurs.

A bottle is understood to be a bottle having a bottom for putting down as also a bottle being provided with additional means or needing a separated holding to form a vertical steadiness of the bottle, as a bottle having a side wall comprising a lower region of the bottle, for storing and optionally applying a liquid, solvent-containing composition. The bottle is closable with a cover, attachment or other closure means.

When using of physically introduced blowing agents only—as done in the patented MuCell method—the multi-layer wall has no residues of degradation products in the finished component. MuCell foamed parts may be recycled to their original polymer group, since the chemistry of the plastic is not modified.

A microcellular structure having substantially closed cells denominates a material not containing a connected cell passageway through the material in a thickness of approximately 200 μm. Thus, a microcellular structure does not have continuous conduits.

Fluid bubbles in microcellular structures contain a fluid. The fluid (from the Latin fluidus, for "flowing") is a common denomination for gases and liquids.

Thermal insulation and density reduction of the microcellular structure are in a ratio of 1.5:1. The higher the thickness of the microcellular structure, the lower the relative density. Thermal insulation effect increases with decreasing density. Stiffness increases with the cube number of the wall thickness.

The density of the wall of the bottle according to the invention is reduced by 35 to 40% in relation to an identical composed bottle made of unfoamed polymers by using a microcellular structure. Weight reduction of the bottle according to the invention amounts to 20 to 30%. Stiffness is a linear function of the change of density.

The barrier layer between inner and outer layer causes no oxygen and/or water vapour to be able to enter or leave the bottle. This means that there are no undesired reactions with air and/or water vapour of the composition situated in the bottle. E.g. no film may be formed in case of acetone-containing compositions.

According to an embodiment, the blowing agent in the microcellular structure has inert gas, in particular nitrogen, gaseous carbon dioxide and/or a mixture of at least two of said gases.

Any blowing agent of a variety known by the person skilled in the art as well as hydrocarbons, chlorofluorocarbons, nitrogen, carbon dioxide, argon and the like as well as mixtures may be used in conjunction with the invention. According to a preferred embodiment, a source provides carbon dioxide or nitrogen or a mixture thereof as blowing agent. Supercritical fluid blowing agents are preferred, in particular supercritical carbon dioxide and/or nitrogen. In particularly preferred embodiments, each only carbon dioxide or nitrogen is used. Where a supercritical fluid blowing agent is used, a single-phase solution of polymer material and blowing agent is generated.

According to an embodiment, it is provided for the bottle to consist of a multi-layer wall completely. In alternatives, the bottle may consist in part of the foamed multi-layer wall and optionally in part of a multi-layer wall not foamed.

Where the container, in particular the bottle, has the polymeric, foamed microcellular structure, the bottle possesses a lower thermal conductivity in an advantageous manner. When having the same wall thickness, the heat transfer from the user's hand into the bonding agent is reduced in the foamed part of the bottle compared to the unfoamed polymer component. The wall thickness in the foamed region may be selected such that the stiffness is not too high and pressing the bottle to carry the bonding agent out of the bottle is not too exhausting.

According to an embodiment, the microcellular structure has a cavity volume, i.e. the cavity volume of the microcellular structure, of less than or equal to 60% and greater than 10%. Preferably, the cavity volume of the microcellular structure amounts from 10% to 60 volume percent based in the total volume of the inner layer and/or outer layer comprising the microcellular structure.

Microcellular structures synonymously to microcellular foam may be produced over a wide range of densities by this invention. In preferred embodiments, the cavity volume is greater than 10%, in particularly preferred embodiments greater than 20%, a microcellular structure with greater than or equal to 50% is preferred also. In further embodiments, the microcellular structure, such as the microcellular foam, has a cavity volume of less than or equal to 50%, preferably less than or equal to 30%. In a particularly preferred embodiment, the microcellular structure, such as the microcellular foam, has a cavity volume of 10% to 50%. Microcellular structures within this preferred range of cavity volumes (from 10% to 50 volume percent based on the total volume of the inner layer and/or outer layer comprising the microcellular structure) show excellent mechanical properties as well as tensile strength and tensile modulus, while still having a significant reduction of density in relation to solid plastic.

According to an embodiment, the weight percentage of inert gas, in particular nitrogen, and/or carbon dioxide based on the total weight of 100% by weight of the microcellular structure of the inner layer and/or of the outer layer amount from 0.20% by weight to 2.5% by weight, preferably from 0.20% by weight to 0.90% by weight.

Therewith, the weight percentage of inert gas is relatively low. Chemical resistance of the bottle is largely given.

According to an embodiment, it is provided for the diameter of the fluid bubbles to be less than or equal to 300 µm, in particular less than or equal to 200 µm, preferably less than or equal to 100 µm, particularly preferably less than or equal to 50 µm.

The cell size of the microcellular structure depends on the weight percentage of the inert gas and on the type of material. In general, the cell size is the smaller, the higher the weight percentage of inert gas is.

According to an embodiment, the barrier layer comprises an ethylene vinyl alcohol copolymer or cyclic olefin copolymers (COC) optionally laminated with polychloro trifluoro ethylene (PCTFE).

Preferably, the barrier layer comprises an ethylene vinyl alcohol copolymer.

Ethylene vinyl alcohol copolymer, abbreviation EVOH, sometimes also EVAL, is a copolymer being formally composed of the monomers ethene and vinyl alcohol. Ethylene vinyl alcohol copolymer is usually used for packaging of foodstuffs and as of late for production of tank containers in automotive industry. Primary intended purpose is the production of a barrier to keep away oxygen in case of foodstuffs and carbon dioxide in case of tank containers. Ethylene vinyl alcohol copolymer is either extruded or laminated as thin layer onto card, foil or other plastics. The properties of the copolymer depend on the amount of ethene in the copolymer. Low ethene amounts result in a copolymer having improved separation properties, higher ethene amounts decrease the processing temperature (softening temperature) of the copolymerisate.

Polyethylene vinyl alcohol (abbreviation: EVOH) possesses very good barrier properties, namely both against oxygen and also against water vapour. Denser EVOH provides the solution for sensible solutions in the bottle according to the invention particularly.

Cyclic olefin copolymers (COC) are obtained by metallocene-catalysed copolymerisation of cyclic olefins (such as norbornene) with alk-1-enes (such as ethene). A series of properties, such as good thermoplastic flowing ability, high stiffness, strength and hardness as well as low density and high transparency with good acid and alkali resistance are common to all COCs. In the field of medicine/diagnostics, excellent biocompatibility, in particular blood compatibility as well as extremely low water absorption/water vapour permeability are to be pointed out.

Polychloro trifluoro ethylene (abbreviation PCTFE) is a fully halogenated polymer ranking among the class of polyhalogeno olefins. PCTFE is a homopolymer being composed of the monomer chloro trifluoro ethylene. PCTFE as other fluoroplastics is very resistant against a lot of chemicals. Besides, PCTFE possesses the highest hardness, strength and stiffness among the fluoroplastics. PCTFE is dimensionally stable, mechanically processable very well and may be used in a wide temperature range (approximately −240° C. to +205° C.). The thermal conductivity of PCTFE amounts to 0.209 W/(K·m) and is thus in the range of the thermal conductivity of the microcellular structure. PCTFE is a transparent high barrier material for blister applications. PCTFE foils provide very good barrier properties in terms of water vapour permeability and good chemical resistance also.

According to an embodiment, it is provided for the inner layer and/or the outer layer to comprise thermoplastics, in particular polyolefins, thermoplastic elastomers (TPE), in particular thermoplastic olefins optionally as copolymer with polyamide, polyester, polystyrene or urethane, and/or polypropylene.

Thermoplastics, also referred to as plastomers, are plastics being (thermoplastically) deformable in a certain temperature range. This process is reversible, this means, it may be repeated any numbers of time by cooling and reheating up to the molten state, so long as so-called thermal decomposition of the material does not occur due to overheating. In that, thermoplastics distinguish from thermosetting plastics and elastomers. Weldability of thermoplastics is a further distinguishing feature. Thermoplastics are composed of low- or non-branched, thus linear carbon chains being connected to each other by low physical bonds only. These bonding forces are more effective when the chains are oriented parallelly. Those regions are referred to be crystalline, in contrast to amorphous (disordered) regions in which the macromolecules are entangled. Originally, thermoplastics have mainly been processed in injection moulding, why they have been referred to as gunning material (in contrast to thermosetting plastics called moulding material). Today, extrusion is a further important processing method. Further processing possibilities are e.g. blow moulding, film blowing, staking and calendering.

Polyolefins are polymers being produced form alkenes such as ethylene, propylene, 1-butene or isobutene by chain polymerisation. Polyolefins are saturated hydrocarbons which quantitatively provide the largest group of plastics. They are partially crystalline thermoplastics being easy processable. They are distinguished by good chemical resistance and electrical insulating properties.

Thermoplastic elastomers (abbreviation TPE, sometimes also referred to as elastoplastics) are plastics behaving similar to classic elastomers at ambient room temperature, but being plastically deformable under heat supply and thus show a thermoplastic behaviour. Thermoplastic elastomers are elastomers behaving like classic representatives of elastomers, but become deformable when heating. A distinction is made between copolymers and elastomer alloys according to the inner structure.

Copolymers are used either as static or as block copolymers. The former consist of a crystalline (and thus physically cross-linking) main polymer, such as e.g. polyethylene, the degree of crystallisation of which is reduced by a comonomer randomly being integrated along the chain, such as e.g. vinyl acetate, to such an extend that the crystallites (=the hard phase) in the finished material (in the example EVA) does not come into direct contact. Afterwards, they act as insulated cross-linking points as in conventional elastomers.

Hard and soft segments in a molecule are clearly separated in block copolymers (e.g. SBS, SIS). In case of TPEs, the material demixes in a continuous and a discontinuous phase below a certain temperature. As soon as the latter falls below its glass transition temperature $T_g$ (the $T_g$ of the continuous phase is distinctly below the later application temperature), it acts as cross-linking point in turn.

Elastomer alloys are polymer blends, thus blends (mixtures) of finished polymers, the plastic thus consists of various kinds of molecules. Custom-made materials (for example polyolefin elastomers made of polypropylene (PP) and natural rubber (NR)—they cover a wide range of hardness depending on quantitative ratio) are obtained by different mixing ratios and additions.

Thermoplastic polyester elastomers (TPE) form a group of block copolymers having hard crystalline and soft gum segments. As a result, they have both thermoplastic and also elastomeric properties being strongly influenced by the ratio between hard and soft segments and by their nature. TPE is used in case of difficult conditions and for example high elasticity in conjunction with high mechanical strength and lifetime is required. Examples include shock-absorbing parts, flexible connections pieces and pipes, seals and membranes. Glass fiber reinforced species are used in case of higher requirements to the deforming temperature.

Resistance against heat and chemicals increases with hardness and inflexibility of the TPE. The hardest species may temporarily withstand 150° C., but approx. 80° C. is the upper limit for longer periods.

Moisture absorption of TPE is highly dependent on the chemical structure. A typical value is 1.1% in case of 23° C. and 50% relative humidity and 0.5% in case of saturation in water at 23° C. TPE is resistant against mineral oils and fats, against non-aromatic hydrocarbons as well as against diluted acids, alkalis and alkalic substances. The material is not resistant against hot water and strong acids and alkalis, alcohol and halogenated and aromatic hydrocarbons. UV resistance is moderate; use of UV stable species is required for outdoor using.

The most important advantage of non-reinforced TPE is the possibility of restoration after deforming which may amount to 25%. Resistance against cold deforming is restricted, whereas the strength in case of elongation is considerably better than those of gum. Impact strength is excellent up to −80° C., depending on the chemical structure.

Olefins is a generic term particularly used in petrochemical industry for all acyclic and cyclic hydrocarbons having one or more carbon-carbon double bonds. The exception of this are aromatic compounds. All alkenes, cyclic alkenes and polyenes are considered to be olefins.

Ethylene propylene diene rubbers (abbreviation EPDM, ethylene propylene diene; M group) are terpolymers made of ethylene, propylene and unspecified diene. EPDM belongs to synthetic rubbers having a saturated mainchain (according to DIN: M group). However, rubbers having an unsaturated main chain, such as e.g. natural rubber or styrene butadiene rubber rank among the R group. In exchange, EPDM rubbers possess double bonds in the side chains and are thus vulcanisable with sulphur also.

Polyethylene of low density (LDPE) is a thermoplastic made of the monomer ethylene. LDPE is defined by a density range of 0.917-0.930 g/cm$^3$. It is not reactive at ambient room temperature, except by strong oxidising agents, and some solvents cause swelling. It may resist permanently to temperatures of 80° C. and temporarily of 95° C. It is rather flexible and tough when being produced in translucent or opaque variations.

Polyethylene of high density (PEHD) is a polyethylene thermoplastic made of crude oil. HDPE with a high ratio of strength to density is used in producing plastic bottles, corrosion-resistant pipe lines, geomembranes and plastic woods. HDPE is known for its high ratio of strength-density. The density of HDPE may be between 930 and 970 kg/m³.

According to an embodiment, the inner layer has a layer thickness of 0.15 to 0.8 mm, the outer layer has a layer thickness of 0.15 to 0.8 mm and the barrier layer has a layer thickness of 0.05 to 0.25 mm.

The layer thickness of the multi-layer wall is thus embodied in an advantageous manner such that the stiffness is not too high and targeted dosing of the liquid, solvent-containing composition is possible by pressing the wall of the bottle according to the invention by hand. In doing so, there is no appreciable heat transfer from the user's hand to the liquid, solvent-containing composition due to the improved thermal insulation effect of the microcellular layer in the inner layer and/or in the outer layer. Undesired overboiling, e.g. in an acetone-containing composition in the bottle of the invention, is prevented.

According to an embodiment, it is provided for the multi-layer wall to comprise a first additional layer between the inner layer and the barrier layer and/or a second additional layer between the barrier layer and the outer layer, the first additional layer and/or the second additional layer comprising coupling agents.

The thickness of the first and second additional layer amount to 0.05 to 0.25 mm. The configuration of inner layer, barrier layer and outer layer is fixed by no means. Depending on the desired properties of the bottle according to the invention, one or more interlayers may be arranged between the inner layer and the barrier layer as well as between the barrier layer and the outer layer.

According to an embodiment, the thermal conductivity A of the multi-layer wall is less than 0.25 W/(m·K). Particularly preferably, the thermal conductivity A of the multi-layer wall is less than or equal to 0.15 W/(m·K), preferably less than or equal to 0.09 W/(m·K), particularly preferably less than or equal to 0.08 W/(m·K), in particular 0.08 W/(m·K) to 0.02 W/(m·K), preferably based on the cross section, i.e. perpendicular to the two-dimensional expansion, i.e. perpendicular to the lateral surface of the multi-layer wall.

The thermal conductivity A of the multi-layer wall being determined by determining the temperature conductivity of the multi-layer wall, in particular the temporal development of the temperature rise of one of the two lateral surfaces of the multi-layer wall (test specimen top side of a material), e.g. top side multi-layer wall being determined by means of an IR detector after a heat pulse on the opposite surface of the multi-layer wall (of the test specimen bottom side, e.g. bottom side of the multi-layer wall (Netzsch LFA 427, Netzsch LFA 467).

The thermal conductivity $\lambda$ of the multi-layer wall being determined by generating a heat pulse on a lateral surface of the multi-layer wall (test specimen bottom side) and concurrently measuring the temperature rise by an IR detector on the opposite surface of the multi-layer wall (test specimen top side).

Thermal conductivity $\lambda$=heat amount in Joule, being directed through a body of a certain cross section in the stationary state in a certain unit of time, the temperature gradient amounting to 1 K, as W (m·K)$^{-1}$, the thermal conductivity $\lambda$ being determined according to FOURIER's law (formula 2).

The thermal conductivity of the microcellular layer is distinctly lower compared to unfoamed polymers. Whereas HDPE has a thermal conductivity of approximately 0.7 to 0.8 W/(m·K), LFPE has a thermal conductivity of approximately 0.5 to 0.6 W/(m·K) and elastomers have a thermal conductivity of approximately 0.09 to 0.3, the thermal conductivity of polymer foams amounts from 0.025 to 0.2 W/(m·K). The thermal conductivity $\lambda$ for polypropylene is at 0.22 W/(m·K). The value may be reduced to 10% by foaming.

The rated value of thermal conductivity may preferably be determined according to DIN EN ISO 220007. Preferably the thermal conductivity is determined using the measurement method Hyperflash® of the company Netzsch Gerätebau.

Thermal conductivity is a substance property and constitutes the heat flow through a material on the basis of thermal conduction. The inverse of the thermal conductivity is the specific thermal resistance. Measurement of thermal conductivity may be performed using a heart flow meter or heat flow calorimeter. Thus, the temperature difference may be determined e.g. with a Peltier element at a defined measuring surface with a given thickness of a specimen. Alternatively, measurement is possible with heat flow sensors determining the heat flow on the basis of the Seebeck effect. In doing so, heat flow and absolute temperature are determined. Determination of the thermal conductivity of a substance may be performed via heat conductance or via Fourier's law. Measuring apparatus, e.g. "Heat Flow Meter 6891/000" of Co. Ceast corresponds to the schematic construction of a stationary test system.

According to the HyperFlash method to be used preferably for determining the thermal conductivity, the temperature conductivity of the specimen is determined. The thermal conductivity may be calculated via the temperature-dependent density and the specific thermal capacity of a plastic, here also of the multi-layer wall, inner layer, barrier layer and/or outer layer. According to the invention, the thermal conductivity is calculated via the temperature-dependent density and the specific thermal capacity of the multi-layer wall comprising at least one inner layer, at least one barrier layer and at least one outer layer.

The measurement may be performed in a contactless manner in a temperature range between −100 and 500° C., in particular in the temperature range of −10 to 100° C., by a Xenon lamp heating the bottom side of the specimen, here one surface of the two sides, in particular one surface of the two side surfaces, of the multi-layer wall. An IR detector measures the temperature rise at the opposite surfaces of the two sides, in particular of the opposite side surface of the multi-layer wall. This method thus determines the thermal conductivity in a direction-dependent manner. The measuring range may be between 0.1 and 2,000 W/(m·K). The specimen used, here multi-layer wall, in particular wall thickness of the multi-layer wall, should have a thickness between 0.01 and 6 mm. Round or polygonal specimens should have a diameter or a side length greater than 6 mm and less than 25.4 mm.

Thus, the measurement is determined by means of an IR detector determining the thermal conductivity from the temporal development of the temperature rise of the test specimen top side of a material (here: one of two opposite surfaces of the multi-layer wall, e.g. top surface) after a heat pulse on the test specimen bottom side (here: the opposite surface of the multi-layer wall, e.g. bottom side) (Netzsch LFA 427, Netzsch LFA 467). A heat pulse is generated on the test specimen bottom side and concurrently measuring the temperature rise by an IR detector on the test specimen top side. Temperature conductivity may be determined from the temporal change of the temperature. Thermal conductivity results from the context (consideration of all three spatial directions, results in the complete thermal conductance equation):

$$\frac{\delta T}{\delta t} = \frac{\lambda}{c_p \rho} \cdot \left( \frac{\delta^2 T}{\delta x^2} + \frac{\delta^2 T}{\delta y^2} + \frac{\delta^2 T}{\delta z^2} \right), \quad \text{(formula 1)}$$

$\frac{\lambda}{c_p \cdot \rho}$ = coefficient of thermal conductivity

The thermal conductivity or coefficient of thermal conductivity $\lambda$ corresponds to that heat amount in Joule, being directed through a body of a certain cross section in the stationary state in a certain entity of time, the temperature gradient amounting to 1 K. The physical unit of this value is $W (m \cdot K)^{-1}$ (Watt per Meter and Kelvin). The empirical core equation (FOURIER's law) for all thermal conduction processes is:

$$\frac{Q}{t} = -\lambda A_0 \frac{\delta T}{\delta x} \quad \text{(formula 2)}$$

Q heat amount
t time
$\lambda$ thermal conductivity
T temperature
x length in heat transfer direction and
$A_o$ cross section of the test object According to an embodiment, the bottle is product of an extrusion blow moulding, in particular of a coextrusion blow moulding.

In this way, the bottle according to the invention may assume any shape. Extrusion blow moulding, also referred to as blow moulding, is a method of plastic processing for producing hollow bodies from thermoplastic plastics. In doing so, the melted polymer is pressed through the nozzle via a conveying screw, so that a hose-like preform is formed (extrusion). This preform is transferred into a blow mould and is adapted to the inner contours of the mould by internal pressure (blow moulding)

According to an embodiment, the bottle volume amounts to 0.5 to 10 ml and the total layer thickness of the multi-layer wall amounts to 0.5 to 1.2 mm.

Therewith, the bottle or even the tube is feasible for the dental field of application for storing and/or applying a liquid, solvent-containing composition.

According to an embodiment, it is provided for the bottle to comprise a dropper, the dropper being rotational symmetric, and the dropper having a drip tray at its distal end, the drip tray being concentrically arranged on an outer periphery of the rotationally symmetric dropper. The dropper itself may be provided with a closure means.

The drip tray enables exact drop forming and clean dripping in an advantageous manner.

In order to secure sealing to the bottle neck, a barrel or a bale seal, respectively, or a lamellar seal are used. Grouting/Prestressing between bottle neck opening and sealing at the injection insert is at 0.3 to 1.5 mm and thus distinctly higher than in case of e.g. beverage closures.

According to an embodiment, the dropper has a dropper insert for dropped application of a liquid, solvent-containing composition, in particular for dental field, stored in the bottle, the dropper insert having a body, being formed in a substantially rotationally symmetric manner and being penetrated by a conduit in axial direction, forming an inlet and an outlet for the liquid composition, the conduit being restricted by an inner circumferential surface of the body. Optionally, such conduit may have at least one protrusion, bar and/or grid extending into the conduit.

The protrusion, bar and/or grid is able to penetrate and/or tear up a film rising up in the conduit, which is formed for example by an acetone-containing liquid, so that bubble forming does not occur in the region of the outlet. Consequently, no bubble may burst in the region of the outlet and result in undesired contaminations. In this way, negative impacts of a post-boiling effect are reduced or removed, respectively. The film and bubble forming process of a dental liquid stored in the container is called "post-boiling effect".

In addition, the protrusion, bar and/or the grid n has the effect that the film penetrated and/or teared off is restrained completely or at least in parts, so that it does not attain to the region of the outlet. Thus, exact drop forming is still possible.

The invention also relates to a method for producing a container, in particular a bottle for storing and optionally applying a liquid composition, in particular solvent-containing composition, comprising a multi-layer wall at least in part to preferably completely, the method comprising the method steps of:
1) a) Providing each a granulate or a mixture of granulates to form an inner layer and/or outer layer of a multi-layer wall having a microcellular structure;
   Forming an extrudate to form an inner layer and/or outer layer of a multi-layer wall having a microcellular structure;
   Mixing at least one extrudate to form an inner layer and/or outer layer of a multi-layer wall having a microcellular structure with inert gas and/or carbon dioxide, and obtaining an extrudate comprising inert gas and/or carbon dioxide, and
b) Providing a granulate of ethylene vinyl alcohol copolymer or cyclic olefin copolymers (COC),
   Forming an extrudate of ethylene vinyl alcohol copolymer or cyclic olefin copolymers (COC), preferably method steps 1) a+b may be performed concurrently or in arbitrary order to form a barrier layer, and optionally
c) Providing a granulate of an extrudate of a thermoplastic polymer, Forming an extrudate from the thermoplastic polymer to form an inner layer and/or outer layer of a multi-layer wall, in particular a thermoplastic elastomer, and
d) Coextrusion blow moulding of a hose having a multi-layer wall from the extrudates a) and b) and optionally c) having the layer design from the inside out: inner layer, barrier layer, outer layer, in a blowing tool or inserting the hose into a blowing tool, followed by the steps of
e) optionally disconnecting or detaching the hose having a multi-layer wall,
f) Blowing up the hose provided in the blowing tool having a multi-layer wall to be a container having a multi-layer wall, in particular a bottle, in particular the multi-layer wall of the container has
  (i) an outer layer (i.a) made of the extrudate comprising inert gas and/or carbon dioxide to form an outer layer of a multi-layer wall having a microcellular structure, or
  (i.b) made of an extrudate of a thermoplastic polymer, in particular of a thermoplastic elastomer, (ii) a barrier layer made of the extrudate of ethylene vinyl alcohol copolymer or cyclic olefin copolymers (COC), and (iii) an inner layer (iii.a) made of the extrudate comprising inert gas and/or carbon dioxide to form an outer layer of a multi-layer wall having a microcellular structure, or (iii.b) made of an extrudate of a thermoplastic polymer, in particular of a thermoplastic elastomer, the multi-layer wall of the container comprising from the inside out an inner layer, barrier layer and an outer layer, at least one inner or outer layer or inner and outer layer have a microcellular structure, and f) Obtaining a container, in particular a bottle or tube, having a multi-layer wall.

Likewise, a bag, sachet, vial or other containers mentioned or known by the person skilled in the art may be produced in this method.

The invention further relates to a method for production a bottle for storing and optionally applying a composition, in particular a liquid or pasty composition, preferably a solvent-containing composition, having a multi-layer wall, characterised in that the method comprises the method steps of:

providing a granulate or a mixture of granulates to form an inner layer and/or outer layer of a multi-layer wall having a microcellular structure;

Forming an extrudate to form an inner layer and/or outer layer of a multi-layer wall having microcellular structure;

Mixing the extrudate with inert gas and/or carbon dioxide, and a) (i) Extrusion blow moulding of an outer layer of the bottle from the extrudate comprising inert gas and/or carbon dioxide to form an inner layer and/or outer layer of a multi-layer wall having a microcellular structure, (ii.1) Providing an extrudate of ethylene vinyl alcohol copolymer or cyclic olefin copolymers (COC), (ii.2) Extrusion blow moulding of a barrier layer from the extrudate of ethylene vinyl alcohol copolymer or cyclic olefin copolymers (COC), and (iii) Extrusion blow moulding of an inner layer of the bottle from the extrudate to form an inner layer of a multi-layer wall having a microcellular structure, or b) (i) Extrusion blow moulding of an outer layer of the container, in particular of the bottle, from an extrudate of a thermoplastic polymer, preferably from a thermoplastic elastomer, (ii.1) Providing an extrudate of ethylene vinyl alcohol copolymer or cyclic olefin copolymers (COC)

(ii.2) Extrusion blow moulding of a barrier layer from the extrudate of ethylene vinyl alcohol copolymer or cyclic olefin copolymers (COC), and (iii) Extrusion blow moulding of an inner layer of the bottle form the extrudate comprising inert gas and/or carbon dioxide to form an inner layer of a multi-layer wall having a microcellular structure; or c) (i) Extrusion blow moulding of an outer layer of the bottle from the extrudate comprising inert gas and/or carbon dioxide to form an outer layer of a multi-layer wall having a microcellular structure;

(ii.1) Providing an extrudate of ethylene vinyl alcohol copolymer or cyclic olefin copolymers (COC)

(ii.2) Extrusion blow moulding of a barrier layer from the extrudate of ethylene vinyl alcohol copolymer or cyclic olefin copolymers (COC), and (iii) extrusion blow moulding of an inner layer of the container, in particular of the bottle, from the extrudate of a thermoplastic polymer, preferably from a thermoplastic elastomer, and obtaining a container, in particular a bottle having a multi-layer wall.

Preferably, it is multi-layer extrusion blow moulding with extrudates modified each for the respective layer. In doing so, the layers made of different extrudates are concurrently coextruded as multi-layer wall.

Polymer blends of polymers and/or copolymers also may be used as thermoplastic polymer or generally as granulate or extrudate.

According to an embodiment, providing a microcellular as inner layer and/or outer layer may comprise the following method steps:

Mixing a first granulate and a second granulate in an injection moulding machine for producing a polymer;

Melting the polymer in the injection moulding machine;

Adding a supercritical fluid into the injection moulding machine; and

Dissolving the supercritical fluid in the polymer; or physically and/or chemically introduction of a blowing agent, or Injecting carbon dioxide gas and/or nitrogen gas;

Forming fluid bubbles in the polymer.

Optionally, a supercritical fluid or a blowing agent and/or gas may be used in a combined manner in the method.

The invention relates to a use of a multi-layer wall for producing a container, in particular a bottle, tube or bag, preferably a bottle for storing and optionally applying a liquid, solvent-containing composition, preferably a dental liquid or a dental gel, particularly preferably a dental adhesive, dental bonding agent, dentin coupling agent, dental primer or dental etching agent.

According to a preferred embodiment, the use comprises a bottle having a multi-layer wall for storing and optionally applying a liquid or pasty composition, preferably a solvent-containing composition, particularly preferably a dental liquid or a dental gel, in particular a dental adhesive, dental bonding agent, dentin coupling agent, dental primer or dental etching agent.

The invention relates to a use of multi-layer wall for producing a container, preferably a bottle, the bottle comprising a dropper, the dropper having a dropper insert for dropped application of a liquid for dental field stored in the container, the dropper insert comprising a body being formed in a substantially rotationally symmetric manner and being penetrated by a conduit in axial direction, defining an inlet and an outlet for the liquid.

Further details, features and advantages of the invention arise from the drawings, as well as from the following description of preferred embodiments on the basis of the drawings. In doing so, the drawings merely illustrate exemplary embodiments of the invention, which do not limit the essential inventive idea.

EMBODIMENTS OF THE INVENTION

Figure 1:
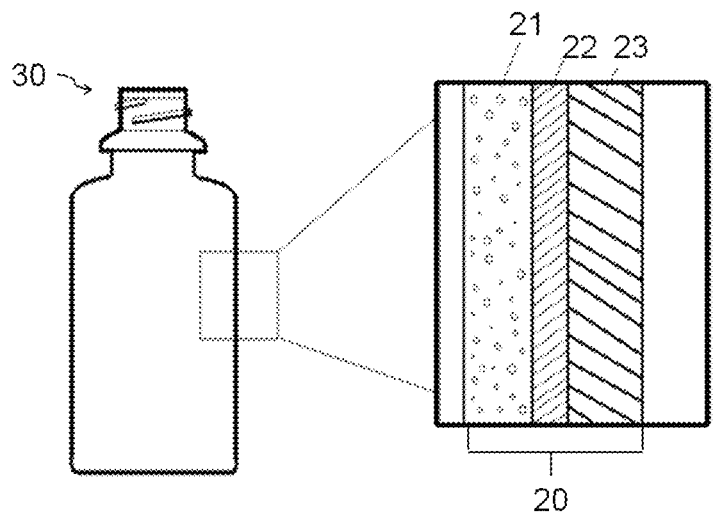
FIG. 1 shows the bottle according to the invention with an enlargement of the multi-layer wall, the inner layer having the microcellular structure.

FIG. 1 shows the bottle 30 according to the invention with an enlargement of the multi-layer wall, the inner layer 21 having the microcellular structure. The bottle 30 has a multi-layer wall 20 in at least one region, the multi-layer wall 20 comprising an inner layer 21, a barrier layer 22 and an outer layer 23. In FIG. 1, the inner layer has the microcellular structure 24, being characterised by fluid bubbles 25 encased. The fluid bubbles 25 have been occurred by a physically or chemically introduced blowing agent into a polymer and form a polymer foam. Blowing agent is an inert gas, in particular nitrogen, gaseous carbon dioxide and/or a mixture of at least two of said gases.

The inner layer 21 and/or the outer layer 23 comprises thermoplastics, in particular polyolefins, thermoplastic elastomers (TPE), in particular thermoplastic olefins optionally as copolymer with polyamide, polyester, polystyrene or urethane and/or polypropylene.

The barrier layer 22 comprises an ethylene vinyl alcohol copolymer or cyclic olefin copolymers (COC) optionally laminated with polychloro trifluoro ethylene (PCTFE). The barrier layer 22 is adapted to form a barrier for oxygen and/or water vapour. In an embodiment, the bottle 30 is product of a multi-layer coextrusion blow moulding with extrudates modified each for the respective layer.

Figure 2:
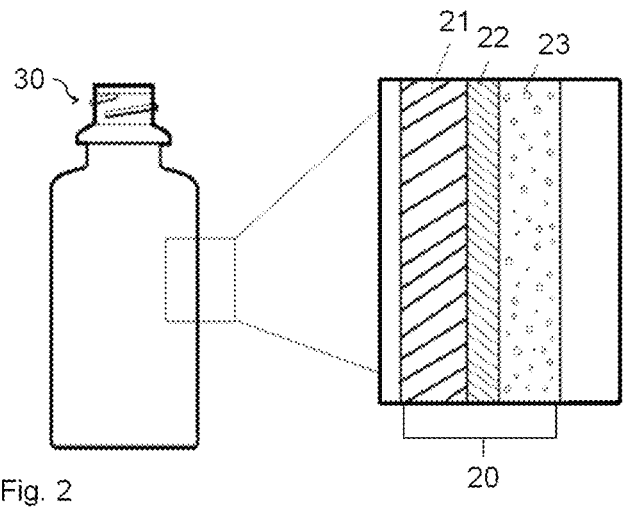
FIG. 2 shows the bottle according to the invention with an enlargement of the multi-layer wall, the outer layer having the microcellular structure.

FIG. 2 shows the bottle according to the invention with an enlargement of the multi-layer wall 20, the outer layer 23 having the microcellular structure.

The multi-layer wall 20 may comprise still additional layers in an embodiment. Thus, for example in one embodiment, at least one additional layer each may be arranged between the inner layer 21 and the barrier layer 22 and/or between the barrier layer 22 and the outer layer 23. Depending on the material of which the said additional layer is made of, additional properties may be given to the bottle.

Figure 3:
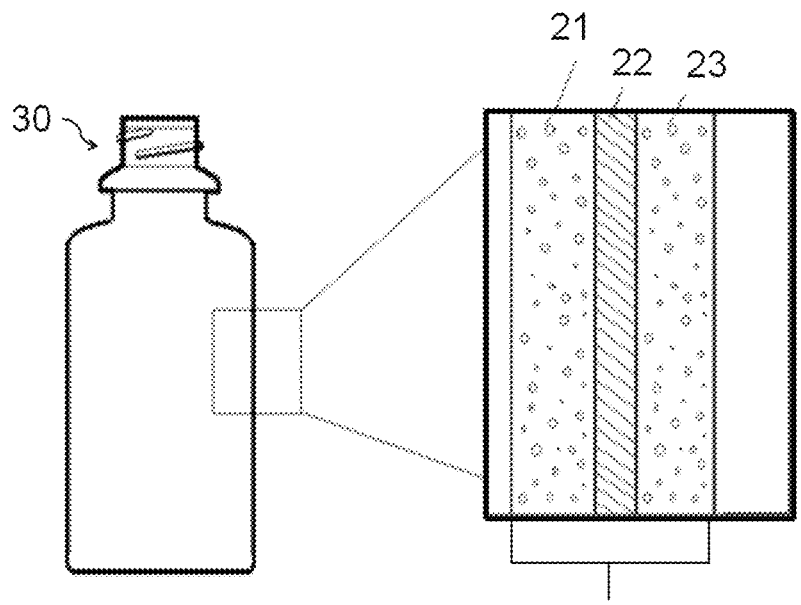
FIG. 3 shows the bottle according to the invention with an enlargement of the multi-layer wall, the inner layer and the outer layer having the microcellular structure.

FIG. 3 shows the bottle 30 according to the invention with an enlargement of the multi-layer wall 20, the inner layer 21 and the outer layer 23 having the microcellular structure. Since the microcellular structure has a very low coefficient of thermal conductivity λ, the thermal conductivity of the multi-layer wall 20 of the bottle 30 is the lowest in this configuration of the layers compared to the previous configurations. The coefficient of thermal conductivity λ is at approx. 0.025 to 0.2 W/(m·K). Thus, overboiling of acetone-containing compositions in the bottle 30 during application is prevented, since hardly no heat is transferred from the user's hand to the acetone-containing composition in the bottle.

Figure 4:
FIG. 4 shows an enlargement of the microcellular structure.

FIG. 4 shows an enlargement of the microcellular structure 24 with the fluid bubbles 25. The size of the fluid bubbles 25 depends on the amount of the blowing agent introduced and the material used.

In a preferred embodiment, a microcellular material according to the invention is produced having an average cell size of less than approximately 60 μm or 50 μm. In some embodiments, a particularly small cell size is desired and, in these embodiments, the material according to the invention has an average cell size of less than approximately 30 μm, particularly preferably less than approximately 20 μm, and in particular preferably less than approximately 10 μm, and most particularly preferably less than approximately 5 μm. The microcellular material preferably has a maximum cell size of approximately 100 μm or preferably less than approximately 75 μm. In embodiments where a particular small cell size is desired, the material may have a maximum cell size of approximately 50 μm, particularly preferably approximately 35 μm and most particularly preferably approximately 25 μm. A series of embodiments contain all combinations of these characterised average cell sizes and maximum cell sizes. For example, one embodiment in this series of embodiments contains a microcellular material, having an average cell size of less than approximately 30 μm with a maximum cell size of approximately 40 μm, und as another example an average cell size of less than approximately 30 μm with a maximum cell size of approximately 35 μm. This means that a microcellular material being adapted for a variety of purposes may preferably be generated for this purpose having a particular combination of average cell size and maximum cell size.

Figure 5:
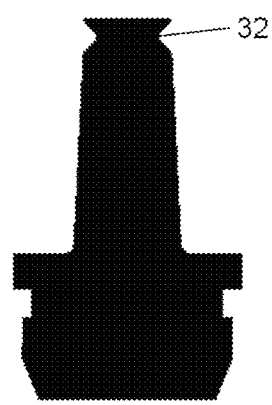
FIG. 5 shows a dropper of the bottle according to the invention having drip tray.

FIG. 5 shows a dropper 31 of the bottle according to the invention having a drip tray 32, being concentrically arranged on an outer periphery of the rotationally symmetric dropper 31. This allows exact drop forming und clean dripping.

Figure 6:
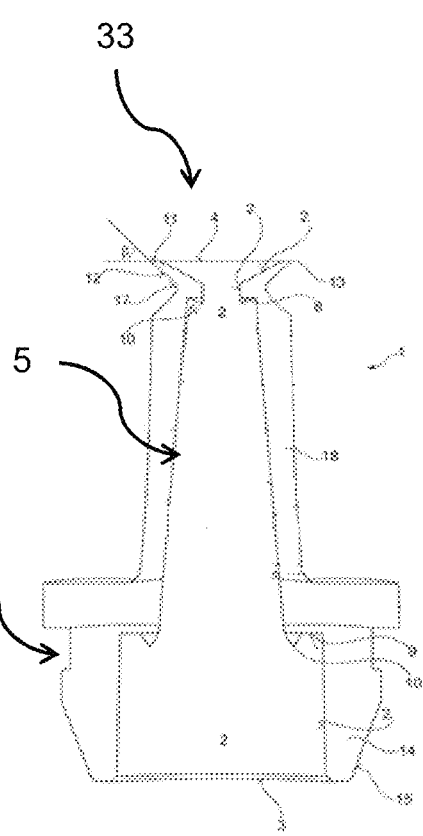
FIG. 6 shows a dropper insert for dropped application of a liquid, solvent-containing composition stored in the bottle.

FIG. 6 shows a dropper insert for dropped application of a liquid, solvent-containing composition stored in the bottle. A dropper insert according to the invention is to be seen in the schematic longitudinal section of FIG. 6, which is connectable to the container or the bottle, respectively, for dropped application of a dental liquid being stored in the container in the form of a bottle.

The dropper insert shown has a body 1 formed substantially rotationally symmetric. The body 1 forms a socket 14 at its lower end for connecting to the bottle. The socket 14 is dimensioned such that it is insertable or pressable in, respectively, into the neck of the bottle. In order to facilitate insertion, the socket 14 has an introduction cone 15 at the end. The introduction cone 15 turns into an outer circumferential section of the socket 14, having a radial oversize in relation to the inner diameter of the bottle neck for producing a compressing connection. In a certain axial distance thereto, a circled collar 16 is formed on the outer circumferential side at the socket 14, providing the maximum pressing-in depth of the dropper insert. At the same time, the dropper insert may be supported by the circled collar 16 at the bottle neck.

A tubular section 18 of the body 1 joins to the socket 14, having a necking 17 at its end averting the socket 14, so that a funnel-shaped end section is formed. The tubular section 18 of the body 1 has a distinctly lower outer diameter than the socket 14. The tubular section 18 is distinctly longer than the socket 14 in axial direction. In doing so, the tubular section 18 forms a type of trunk.

The body 1 over its whole length is penetrated by a conduit 2, defining an inlet 3 and an outlet 4.

The conduit 2 is restricted by an inner circumferential surface 5 of the body 1.

The dropper insert has circular platforms 8 and 9.

In order to ensure exact drop forming and clean dripping, the outlet 4 is restricted by a front surface 11 of the body 1, enclosing an angle β with an outer circumferential surface 12 of the body 1, which is 45° in the present case. In doing so, the front surface 11 and the outer circumferential surface 12 form a drop tear-off edge 13, preventing the dental liquid to attain behind the drop tear-off edge 13 and to drain on the outside at the dropper insert. For this purpose, the outer circumferential surface 12 is funnel-shaped also, the funnel-shape resulting from the necking 17.

Moreover, the geometry of the body 1 in the region of the outlet 4 shown in FIG. 6 has the advantage of the drop size being controllable via the inclined position of the dropper insert. When the dropper insert 31 being vertically hold with the head facing down, bigger drops are formed compared to an inclined position tilted from the vertical position of the dropper insert.

FIG. 6 shows a dropper insert.

LIST OF REFERENCE NUMERALS 1 body
2 conduit
3 inlet
4 outlet
5 inner circumferential surface of the body 1
8 platform
9 platform
10 fin
11 front surface of the body 1
12 outer circumferential surface of the body 1
13 drop tear-off edge
14 socket
15 introduction cone
16 circled collar
17 necking
18 tubular section of the body 1
20 multi-layer wall
21 inner layer
22 barrier layer
22 outer layer
24 microcellular structure
25 fluid bubbles
30 container, bottle
31 dropper
32 drip tray
33 dropper insert

The invention claimed is:

1. A container (30), the container (30), at least in part or in its entirety, having an elastic multi-layer wall (20)
comprising at least an inner layer (21), a barrier layer (22) and an outer layer (23), the barrier layer (22) being adapted to form a barrier for oxygen and water vapour, the inner layer (21) and/or the outer layer (23) having a microcellular structure (24), the microcellular structure (24) having fluid bubbles (25), and the fluid bubbles (25) being product of a physically and/or chemically introduced blowing agent, the thermal conductivity A of the elastic multi-layer wall (20) being less than 0.25 W/(m·K),
wherein
the inner layer (21) and/or the outer layer (23) comprises thermoplastic elastomers (TPE),
the container (30) is a bottle comprising a dropper (31), the dropper (31) is rotationally symmetric,
the dropper (31) has a drip tray (32) at its distal end, and the drip tray (32) is concentrically arranged on an outer periphery of the rotationally symmetric dropper (31).

2. The container (30) according to claim 1, wherein the blowing agent in the microcellular structure (24) has inert gas.

3. The container (30) according to claim 1, wherein the microcellular structure (24) has a cavity volume less than 60% to greater than or equal to 10%.

4. The container (30) according to claim 1, wherein the diameter of the fluid bubbles (25) is less than or equal to 300 μm.

5. The container (30) according to claim 1, wherein the barrier layer (22) comprises an ethylene vinyl alcohol copolymer (EVOH) or cyclic olefin copolymers (COC) optionally laminated with polychloro trifluoro ethylene (PCTFE).

6. The container (30) according to claim 1, wherein the inner layer (21) and/or the outer layer (23) comprises thermoplastic olefins optionally as copolymer with polyamide, polyester, polystyrene or urethane, and/or polypropylene.

7. The container (30) according to claim 1, wherein the inner layer (21) has a layer thickness of 0.15 to 0.8 mm, the outer layer (23) has a layer thickness of 0.15 to 0.8 mm, and the barrier layer (22) has a layer thickness of 0.05 to 0.25 mm.

8. The container (30) according to claim 1, wherein the multi-layer wall (20) comprises a first additional layer (26) between the inner layer (21) and the barrier layer (22) and/or a second additional layer (27) between the barrier layer (22) and the outer layer (23), the first additional layer (26) and/or the second additional layer (27) comprising coupling agents.

9. The container (30) according to claim 1, wherein the container (30) is the product of an extrusion blow moulding process.

10. A method for producing the container (30) according to claim 1, wherein the method comprises the steps of:
1) A)
   providing a granulate or a mixture of granulates to form an inner layer (21) and/or an outer layer (23) of an elastic multi-layer wall (20) having a microcellular structure (24);
   forming at least one extrudate to form an inner layer (21) and/or an outer layer (23) of an elastic multi-layer wall (20) having a microcellular structure (24);
   mixing the at least one extrudate to form an inner layer (21) and/or outer layer (23) of an elastic multi-layer wall (20) having a microcellular structure (24) with inert gas and/or carbon dioxide, and obtaining an extrudate a) comprising inert gas and/or carbon dioxide, and
b)
   providing a granulate of ethylene vinyl alcohol copolymer or cyclic olefin copolymers (COC),
   forming an extrudate b) of the ethylene vinyl alcohol copolymer or the cyclic olefin copolymers (COC), and
c)
   providing a granulate of a thermoplastic polymer,
   forming an extrudate c) from the thermoplastic polymer, and
d) coextrusion blow moulding of a hose in a blowing tool or inserting the hose into a blowing tool, the hose having an elastic multi-layer wall (20) from the extrudates a), b), and c) having the layer design from the inside out: inner layer, barrier layer, outer layer, followed by the steps of
e) blowing up the hose provided in the blowing tool having an elastic multi-layer wall to be a container, having an elastic multi-layer wall or a bottle, the elastic multi-layer wall of the container having (i) the outer layer (23)
   made of the extrudate a) comprising the inert gas and/or carbon dioxide to form the outer layer (23) of the elastic multi-layer wall (20) having the microcellular structure (24) or
   made of the extrudate c) of the thermoplastic elastomer,
(ii) the barrier layer (22) made of the extrudate b) of the ethylene vinyl alcohol copolymer or the cyclic olefin copolymers (COC), and
(iii) the inner layer (21)
   made of the extrudate a) comprising the inert gas and/or the carbon dioxide to form the outer layer (23) of the elastic multi-layer wall (20) having the microcellular structure (24), or
   made of the extrudate c) of the thermoplastic polymer, of a thermoplastic elastomer, the elastic multi-layer wall of the container (30) comprising from the inside out the inner layer, the barrier layer and the outer layer, at least one of the inner layer and the outer layer having the microcellular structure (24), and
f) obtaining the container (30) or the bottle (30) having the elastic multi-layer wall (20),
or
2) a)
   (i) extrusion blow moulding of an outer layer (23) of a container (30) or a bottle (30), from an extrudate a) to form an outer layer (23) of an elastic multi-layer wall (20) having a microcellular structure (24), or from an extrudate c) of a thermoplastic polymer, from a thermoplastic elastomer to form an inner layer (21) of an elastic multi-layer wall (20),
   (ii.1) providing an extrudate b) of ethylene vinyl alcohol copolymer or cyclic olefin copolymers (COC),
   (ii.2) extrusion blow moulding of a barrier layer (22) from the extrudate b) of the ethylene vinyl alcohol copolymer or the cyclic olefin copolymers (COC), and
   (iii) extrusion blow moulding of an inner layer (21) of the container or the bottle (30), from
   the extrudate a) comprising inert gas and/or carbon dioxide to form an inner layer (21) of an elastic multi-layer wall (20) having a microcellular structure (24), or from the extrudate c) of the thermoplastic polymer, from the thermoplastic elastomer to form an inner layer (21) of an elastic multi-layer wall (20),
   and obtaining the container (30) or the bottle (30) having an elastic multi-layer wall (20).

11. A method comprising:
   storing a liquid or pasty composition, a solvent-containing composition, a dental liquid or a dental gel, a dental adhesive, a dental bonding agent, a dentin coupling agent, a dental primer, or a dental etching agent inside the container (30) according to claim 1; and
   applying the liquid or pasty composition, the solvent-containing composition, the dental liquid or the dental gel, the dental adhesive, the dental bonding agent, the dentin coupling agent, the dental primer, or the dental etching agent from the container (30).

12. A method of using the elastic multi-layer wall (20) for producing the container (30) according to claim 1 or obtainable according to the method of claim 10, wherein the container (30) is configured for storing and applying a liquid, solvent-containing composition, a dental liquid or a dental gel, a dental adhesive, dental boding agent, dentin coupling agent, dental primer, or dental etching agent.

* * * * *